United States Patent
Sibatani et al.

[11] 3,893,543
[45] July 8, 1975

[54] RESILIENT STRUCTURE FOR DISC BRAKE FRICTION PAD

[75] Inventors: Juichi Sibatani; Sadayoshi Itou; Masachika Yamamoto; Mithuhiko Nakagawa, all of Itami, Japan

[73] Assignees: Sumitomo Electric Industries, Ltd., Osaka; Toyota Motor Co., Ltd., Aichi, both of Japan

[22] Filed: Oct. 23, 1973

[21] Appl. No.: 408,909

[30] Foreign Application Priority Data
Oct. 21, 1972 Japan.............................. 47-121891

[52] U.S. Cl............................... 188/1 A; 340/52 A
[51] Int. Cl............................................. F16d 66/02
[58] Field of Search.................. 188/1 A; 200/61.44; 340/52 A

[56] References Cited
UNITED STATES PATENTS
3,716,113    2/1973    Kobayashi et al. ................ 188/1 A Primary Examiner—Duane A. Reger
Attorney, Agent, or Firm—Sughrue, Rothwell, Mion, Zinn & Macpeak

[57] ABSTRACT

Herein disclosed is a resilient structure for use in a disc brake of the type including an electric wire having its looped end extending in the brake lining from the rear side thereof with a predetermined distance, and detecting means feeding an electric current to the electric wire for detecting disconnection at the looped end to indicate that the brake lining is worn out to exceed the working limit of the disc brake. The resilient structure includes a guide member pressor extending circumferentially of the brake disc and resiliently engaged with the guide member of the disc brake for applying a thrust to the latter, and a resilient arm extending from the guide member pressor and engaged with the electric wire for applying a tension to the same to ensure said disconnection. The resilient structure may be made of a simple spring wire, and biases the friction pad so as to prevent undesirable noises which might otherwise be produced at the frictional engagement between the friction pad and the brake disc.

7 Claims, 2 Drawing Figures

RESILIENT STRUCTURE FOR DISC BRAKE FRICTION PAD

BACKGROUND OF THE INVENTION

1. Field of the Invention

The present invention relates to a disc brake and, more particularly, to a resilient structure for use in a disc brake.

2. Description of the Prior Art

In disc brake technology, it is well known that folded extension of an insulated electric wire is disposed in a friction pad at a portion where the working limit of its brake lining falls. This concept is disclosed in West German Patent No. 1,045,259, in which the coating of the electric wire at that particular portion is worn out by the frictional engagement with the rotating brake drum to establish electric conduction inbetween. This conduction indicates that the brake lining has been worn out to exceed its working limit.

In British Patent No. 1235367, on the other hand, the friction pad is biased by a spring wire so that any possible noises may be eliminated.

In U.S. Pat. No. 3,556,258, moreover, a wear detector having a loop circuit is disclosed, in which a first warning signal is produced when the loop circuit is brought into contact with the brake disc, and in which a second warning signal is produced when the loop circuit is disconnected as a result that wearing of the friction pad has proceeded to a predetermined extent.

SUMMARY OF THE INVENTION

As is well known in the art, it is advantageous as a wear detector of a brake lining of a disc brake that a looped electric wire is mounted in a portion of a friction pad located at its working limit, because the construction arrangement of the wear detector is remarkably simplified.

Even with such construction, it is desirable to ensure disconnection at the looped portion of the electric wire due to wearing of the frictional pad. And, it is often experienced that the friction pad will make noises due to the unavoidable viabrations of an automotive vehicle, which carries the disc brake, when it is not actuated. The pad may often touch the rotating brake disc to utter a so-called "squeak". When, moreover, the disc brake is to be actuated, the pad may often receive a considerable torque from the rotating disc, and at this particular instant it will make an impact noise. Even while the disc brake is being actuated, on the other hand, the friction between the pad and the rotating disc may often experience a so-called "stick-slip motion", to thereby utter the so-called "squeal".

It is, therefore, an object of the present invention to provide an improved disc brake in which disconnection at the looped portion of an electric wire can be ensured.

Another object of the present invention is to provide an improved disc brake of the above type in which such noises as are produced at a friction pad when it is disengaged from, brought into engagement with, or engaged with the rotating brake disc can be eliminated.

According to an aspect of the present invention, therefore, a simple spring wire is provided which includes a thrusting portion for biasing the friction pad in the rotational direction of the brake disc, and a resilient arm for applying a tension to the electric wire to ensure the disconnection of the same.

BRIEF DESCRIPTION OF THE DRAWING

Other objects and advantages of the present invention will be apparent from the following description taken in conjunction with the accompanying drawing, in which.

DESCRIPTION OF THE PREFERRED EMBODIMENT

Figure 1:
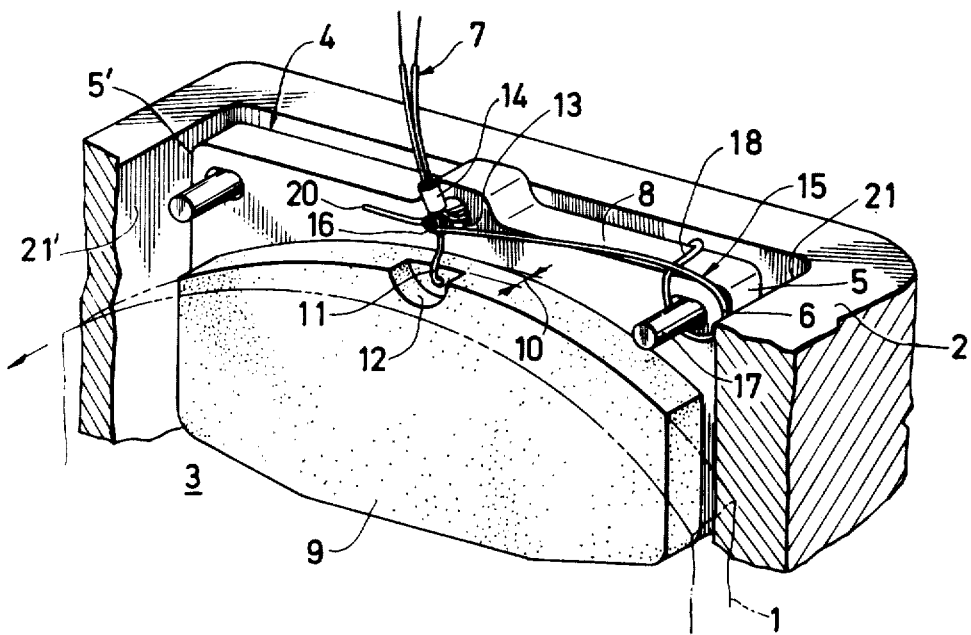
FIG. 1 is a perspective view showing a portion of a disc brake to which the resilient structure of the present invention is attached.
Figure 2:
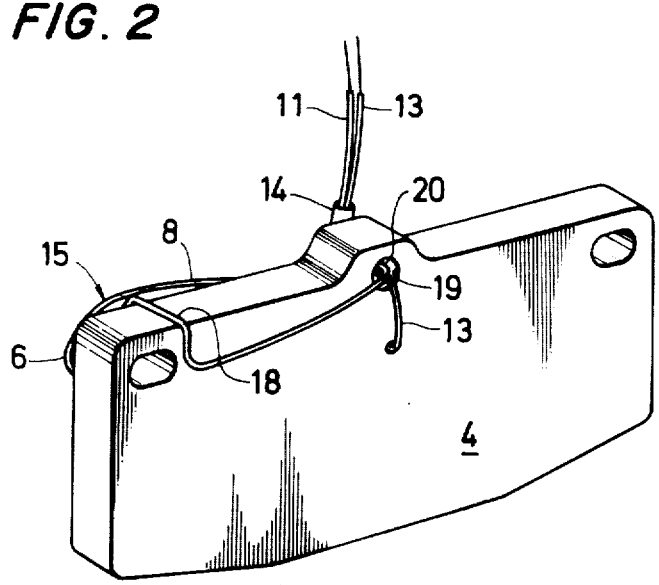
FIG. 2 is a perspective view showing the resilient structure and a friction pad from the rear side thereof.

Referring now to FIG. 1, a friction pad 3, is pushed and retracted along an axis of rotion of a rotatable brake disc 1 by means of an actuating mechanism (not shown) into and out of frictional engagement with the brake disc 1. This brake disc 1 is shown to rotate about its axis in the direction of the arrow, for illustrative purposes only. The friction pad 3 is, as customary, composed of a brake lining 9 and a back plate 4. It is well known in the art that a proper braking force cannot be obtained when the brake lining 9 is worn out to such an extent that it has a thickness less that at 10 between arrows, of FIG. 1. Various types of detectors for detecting the working limit of the brake lining 9 have been put into actual use. Among them, a detector of electric type using an electric wire has been employed due to in its simple construction.

In FIG. 1, an insulated electric wire 7 is shown to extend through a portion of the back plate 4 and the brake lining 9. This electric wire 7 has its one end portion 11 bent radially of the brake disc 1 from the bottom surface of a semicylindrical groove 12 which is formed by cutting away a portion of the brake lining 9 in a manner to leave the remaining portion of a thickness 10 as it is. This end portion 11 is then bundled together with the other end portion 13, which comes from the back of the back plate 4, to form a loop, and is bound by means of a sleeve 14.

The extending end of a resilient arm 8 of a later-described resilient structure 15 is coiled to form an end ring 16, into which the end portion 11 of the electric wire 7 is inserted. This end portion 11 is tensioned at least between the sleeve 14 and the bottom surface of the groove 12, by the resilient arm 8.

When, in operation, the friction pad 3 is progressively worn out to the working limit, and a portion of the end portion 11 of the electric wire 7 as is located above the bottom surface of the groove 12 is worn out and cut away by its frictional engagement with the surface of the rotating brake disc 1. As a result, the particular portion is disconnected or separated by the spring tension being applied thereto. Here, the electric wire 7 is fed with an electric current by a suitable detecting means (not shown), which detects the disconnection at the bent portion of the electric wire 7 so as to produce a warning signal indicating that the brake lining 9 has been worn out to its working limit.

The resilient arm 8 is made to extend to the right-hand side of FIG. 1 from the end ring 16, and is turned back on itself to form a portion which projects from the side surface 5 of the back plate 4, to thereby form a guide member pressor 6. The resilient structure 15 is made to further extend around the periphery of a support pin 17 supporting the friction pad 3, and it is constructed to stride in a shape of a capital letter, "U" over the top edge of the back plate 4, thereby to form a crossover portion 18, as shown. Then, the resilient structure 15 further extends into a central hole 19 formed in the back plate 4 and terminates in an engaging end portion 20. Thus, the resilient structure 15 is retained at its end portion 20 in the central hole 19 and has its guide member pressor 6 biased circumferentially of the brake disc 1 toward a guide surface 21 of a guide member 2 by a biasing force, which is built up mainly at the crossover portion 18.

With these construction, therefore, a side surface 5' on the opposite side of the back plate 4 is thrust against an opposite guide surface 21' by the biasing force of the resilient structure 15. As there is only a slight clearance between the brake lining 9 and the brake disc, when the friction pad 3 is not pushed, the possible vibrations of a wheel, on which the disc brake under consideration is mounted, will generally produce squeak due to the undesirable contact of the brake lining 9 with the brake disc 1. This undesirable phenomena can be eliminated in the present disc brake, because the brake lining 9 is prevented from direct contact with the brake disc 1. More specifically, the lining 9 can be isolated by spacing it from the disc 1 by the frictional engagement between the side surface 5' and the guide surface 21', and by the frictional engagement between the thrusting portion 6 and the guide surface 21 and/or between the support pin 17 and a portion of the resilient structure 15 between the guide member pressor 6 and the crossover portion 18.

Since, on the other hand, the resilient structure 15 applies biasing forces, which are opposite to each other with respect to the circumferential direction of the brake disc 1, to the guide member pressor 6 and to the back plate 4, the brake lining 9 has its righthand portion (or of the side of the thrusting portion 6) spaced from the surface of the brake disc 1 by a larger distance than the lefthand portion when the pushing force to be exerted on the brake lining 9 is removed. As a result, when the lining 9 is pushed onto brake disc 1 in the subsequent brake actuation, its lefthand portion, in other words, the trailing side of the lining 9, as viewed with respect to the direction of rotation of the disc 1 shown at the arrow, is at first brought into the frictional contact. Thus, squeal can be efficiently eliminated.

As has been described in the above, the resilient structure according to the present invention can ensure the warning operation of the electric wire 7 by imparting a tension to the same, even with a considerably simplified construction arrangement. The present resilient structure should also be appreciated in that it can efficiently eliminate the undesirable noises which might otherwise be concomitant with the disc brake.

What is claimed is:

1. In a disc brake assembly wherein: a friction pad is mounted for limited movement toward and away from a rotating brake disc in a direction parallel to the axis of disc rotation and between laterally spaced guide surfaces of a fixed guide member, and wherein an insulated wire is loop coupled to the movable brake friction pad and a resilient member is mounted on the back plate of the movable friction pad and engages the insulated wire to move at least one portion of the loop away from the back plate upon severance of the wire by brake pad wear, the improvement wherein: said resilient member comprises: a resilient guide member pressor which protrudes laterally from one side of the back plate and laterally engages one of said laterally spaced guide surfaces for biasing the other side of said back plate into contact with the other guide surface to eliminate squeal when applying the brake, and said resilient member further comprises a unitary resilient arm, said arm engaging said insulated wire loop and exerting a tensioning force thereon to bias said wire loop radially outwards relative to the axis of rotation of said brake disc such that the resilient arm carries the loop portion of said insulated wire radially outwards of said brake disc when loop severance occurs.

2. A resilient structure according to claim 1, wherein said guide member pressor and said resilient arm are made of a continuous spring wire.

3. A resilient structure according to claim 2, wherein said resilient arm has a looped end surrounding said wire for retaining said electric wire thereat.

4. In a disc brake including: a brake disc rotatable about its axis, a guide member fixedly positioned to one side of said brake disc, a laterally movable friction pad mounted to said guide member and movable toward and away from said friction disc and guided at respective ends by guide surfaces formed by said guide member, said friction pad including a brake lining and a back plate, actuating means for moving said friction pad to bring the brake lining of the same into engagement with said brake disc, and an electric wire extending into said brake lining from the rear side thereof by way of a looped end for detecting disconnection at the looped end to indicate wear of the brake lining to the extent of a predetermined thickness, the improvement comprising: a resilient structure mounted on the back plate of the movable friction pad and comprising a resilient guide member pressor which extends circumferentially beyond said brake disc and protrudes laterally from one side of the back plate, in engagement with one of said laterally spaced guide surfaces for biasing the other side of the back plate into surface contact with the other guide surface to eliminate squeal when applying the brake, and a unitary resilient arm which engages said insulated wire looped end and exerts a tensioning force biasing said looped end radially outwards relative to the axis of rotation of said brake disc so as to force the looped end radially outwards upon severance of the looped end by wear of said brake lining to said predetermined thickness.

5. The disc brake according to claim 4, wherein said resilient structure comprises a continuous spring wire, said wire is reversely looped intermediate its ends and said reverse loop engages said one surface of said guide member and forms said guide member pressor.

6. The disc brake as claimed in claim 5, wherein said back plate includes at least one hole therein and said continuous spring wire includes a portion extending from said reverse loop and crossing over the upper edge of said back plate, and which further extends along a portion of the back of said plate and terminating within said hole from the back side to the front side to impart resiliency to both said guide member pressor and to said arm.

7. The disc brake according to claim 6, wherein: a pair of support pins extend axially outwardly of said guide member parallel to said guide surfaces and spaced inwardly therefrom, said back plate includes openings therein at positions corresponding to the pins and said plate is slidably mounted on said pins, said spring wire reverse loop is carried on one of said pins, and said hole within said back plate lies intermediate of the openings receiving said pins and said wire loop extends through said hole along with the terminal end of said wire spring portion.

* * * * *